United States Patent
Kajiwara et al.

(10) Patent No.: US 10,505,491 B2
(45) Date of Patent: Dec. 10, 2019

(54) ELECTRONIC CONTROL APPARATUS FOR A POWER SUPPLY SYSTEM WITH A ROTATING ELECTRICAL MACHINE

(71) Applicant: DENSO CORPORATION, Kariya, Aichi-pref. (JP)

(72) Inventors: Yasuhiro Kajiwara, Kariya (JP); Toshiki Sakakibara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/379,842

(22) Filed: Apr. 10, 2019

(65) Prior Publication Data

US 2019/0312541 A1    Oct. 10, 2019

(30) Foreign Application Priority Data

Apr. 10, 2018  (JP) .................................. 2018-075357
Jan. 16, 2019  (JP) .................................. 2019-005337

(51) Int. Cl.
*H02P 27/06* (2006.01)
*H02M 7/48* (2007.01)
*H02P 9/04* (2006.01)
*H02K 1/22* (2006.01)

(52) U.S. Cl.
CPC .............. *H02P 27/06* (2013.01); *H02K 1/22* (2013.01); *H02M 7/48* (2013.01); *H02P 9/04* (2013.01)

(58) Field of Classification Search
CPC ........ H02M 7/12; H02M 7/145; H02M 7/155; H02M 7/1555; H02M 7/162; H02M 7/1623; H02M 7/21; H02M 7/217; H02M 7/219; H02M 7/48; H02M 7/66; H02M 7/75; H02M 7/757; H02P 9/04; H02P 24/04; H02P 24/06; H02K 1/22
See application file for complete search history.

(56) References Cited

U.S. PATENT DOCUMENTS

2017/0257052 A1*  9/2017  Yamamoto ............. B60K 6/445
2018/0076657 A1*  3/2018  Nishimura ................ H02J 9/06
2018/0237268 A1*  8/2018  Agirman ............... B66B 11/043
2018/0257496 A1*  9/2018  Andoh ..................... H02P 27/08
2018/0334046 A1* 11/2018  Lee .......................... B60L 50/10

FOREIGN PATENT DOCUMENTS

JP     2015-149849 A     8/2015
JP     2018-182949 A    11/2018
WO  WO-2018193782 A1 * 10/2018

* cited by examiner

*Primary Examiner* — Yusef A Ahmed
*Assistant Examiner* — Shahzeb K Ahmad
(74) *Attorney, Agent, or Firm* — Oliff PLC (57) ABSTRACT

An electronic control apparatus is used for a power supply system that includes a rotating electric machine, a power generation control unit, first and second storage batteries, first and second switches, and a host control unit. The electronic control apparatus determines whether a predetermined process completion condition is met, without communicating with the host control unit, after an ignition switch of a vehicle is switched from an on state to an off state. The process completion condition indicates that a predetermined switch-off process is completed. The switch-off process is performed by the power generation control unit after the ignition switch is switched from the on state to the off state. The electronic control apparatus maintains the first switch in on state until determined that the process completion condition is met after the ignition switch is switched from the on state to the off state.

8 Claims, 10 Drawing Sheets

ELECTRONIC CONTROL APPARATUS FOR A POWER SUPPLY SYSTEM WITH A ROTATING ELECTRICAL MACHINE

CROSS-REFERENCE TO RELATED APPLICATION

This application is based on and claims the benefit of priority from Japanese Patent Application No. 2018-075357, filed Apr. 10, 2018 and Japanese Patent Application No. 2019-005337, filed Jan. 16, 2019. The entire disclosures of the above applications are incorporated herein by reference.

BACKGROUND

Technical Field

The present disclosure relates to an electronic control apparatus that controls power generation in a vehicle to which an engine is mounted.

Related Art

A battery unit is known that includes an internal storage battery. The battery unit is connected to an external storage battery and a rotating electric machine. The battery unit also includes first and second switches. The first switch is arranged on an energization path that connects the external storage battery and the rotating electric machine. The second switch is arranged on an energization path that connects the internal storage battery and the rotating electric machine. A host control apparatus is communicably connected between the battery unit and a rotating electric machine unit provided with the rotating electric machine. The host control apparatus controls power running and power generation of the rotating electric machine and controls on and off states of the switches in the battery unit.

SUMMARY

The present disclosure provides an electronic control apparatus for a power supply system that includes a rotating electric machine, a power generation control unit, first and second storage batteries, first and second switches, and a host control unit. The electronic control apparatus determines whether a predetermined process completion condition is met, without communicating with the host control unit, after an ignition switch of a vehicle is switched from an on state to an off state. The process completion condition indicates that a predetermined switch-off process is completed. The switch-off process is performed by the power generation control unit after the ignition switch is switched from the on state to the off state. The electronic control apparatus maintains the first switch in on state until determined that the process completion condition is met after the ignition switch of the vehicle is switched from the on state to the off state.

DESCRIPTION OF THE EMBODIMENTS

In related art mentioned above, the rotating electric machine unit is required to perform a plurality of processes (referred to, hereafter, as a switch-off process), after an ignition (IG) switch of a vehicle set to an off state. The switch-off process includes vibration suppression control, stopping position control, end diagnosis (termination diagnosis), and data-writing to flash read-only memory (ROM). Thus, the battery unit controls the first switch such that voltage supply from the external storage battery to the rotating electric machine unit is continued even after the IG switch of the vehicle is set to the off state.

Meanwhile, after the above-described switch-off process is completed, the rotating electric machine unit transmits a power-supply-stop permission signal to the host control apparatus via a communication line to reduce dark current. Then, the host control apparatus that has received the power-supply-stop permission signal transmits a voltage-supply-stop command to the battery unit. As a result, the battery unit stops voltage supply to the rotating electric machine unit.

However, when communication between the host control apparatus and the rotating electric machine unit is interrupted, the host control apparatus is unable to receive the power-supply-stop permission signal from the rotating electric machine unit. Thus, for example, when the vehicle is stopped for a long period of time, such as when the vehicle is parked, voltage supply from the external storage battery to the rotating electric machine unit continues for a long period of time. As a result, depletion or degradation of the external storage battery is hastened. Startup failure of the engine may occur.

It is thus desired to suppress depletion or degradation of an external storage battery caused by a communication abnormality.

An exemplary embodiment of the present disclosure provided an electronic control apparatus for a power supply system that includes a rotating electric machine, a power generation control unit, a first storage battery, a second storage battery, a first switch, a second switch, a switch control unit, and a host control unit.

A rotation shaft of the rotating electric machine is connected to an output shaft of an engine of a vehicle. The power generation control unit controls at least power generation using the rotating electric machine. The first storage battery and the second storage battery are connected in parallel to the rotating electric machine.

The first switch is arranged on a first energization path that electrically connects the rotating electric machine and the first storage battery. The first switch is switched to either of a first conduction state and a first non-conduction state. The first conduction state is a state in which the first energization path is electrically conductive. The first non-conduction state is a state in which the first energization path is not electrically conductive.

The second switch is arranged on a second energization path that electrically connects the rotating electric machine and the second storage battery. The second switch is switched to either of a second conduction state and a second non-conduction state. The second conduction state is a state in which the second energization path is electrically conductive. The second non-conduction state is a state in which the second energization path is not electrically conductive.

The switch control unit controls switching between the first conduction state and the first non-conduction state of the first switch, and switching between the second conduction state and the second non-conduction state of the second switch. The host control unit communicably connected to the power generation control unit and the switch control unit. The host control unit controls the power generation control unit and the switch control unit.

The electronic control apparatus is used as the switch control unit in the power supply system. The electronic control apparatus includes includes a completion determining unit and an on-maintaining unit.

The completion determining unit determines whether a predetermined process completion condition is met, without communicating with the host control unit, after an ignition switch of the vehicle is switched from an on state to an off state. The process completion condition indicates that a predetermined switch-off process is completed. The switch-off process is performed by the power generation control unit after the ignition switch is switched from the on state to the off state.

The on-maintaining unit maintains the first switch in the on state until the completion determining unit determines that the process completion condition is met after the ignition switch of the vehicle is switched from the on state to the off state.

The electronic control apparatus configured as described above can maintain the first switch in the on state until the switch-off process is completed and switch the first switch to the off state after the switch-off process is completed, even when an abnormality occurs in the communication with the host control unit and a voltage-supply-stop command cannot be acquired from the host control unit.

Therefore, the electronic control apparatus of the present disclosure can supply the voltage required for the power generation control apparatus to perform the switch-off process after the ignition switch is switched from the on state to the off state. The electronic control apparatus can also suppress depletion or degradation of the first storage battery caused by a communication abnormality.

First Embodiment

A first embodiment of the present disclosure will hereinafter be described with reference to the drawings.

Figure 1:
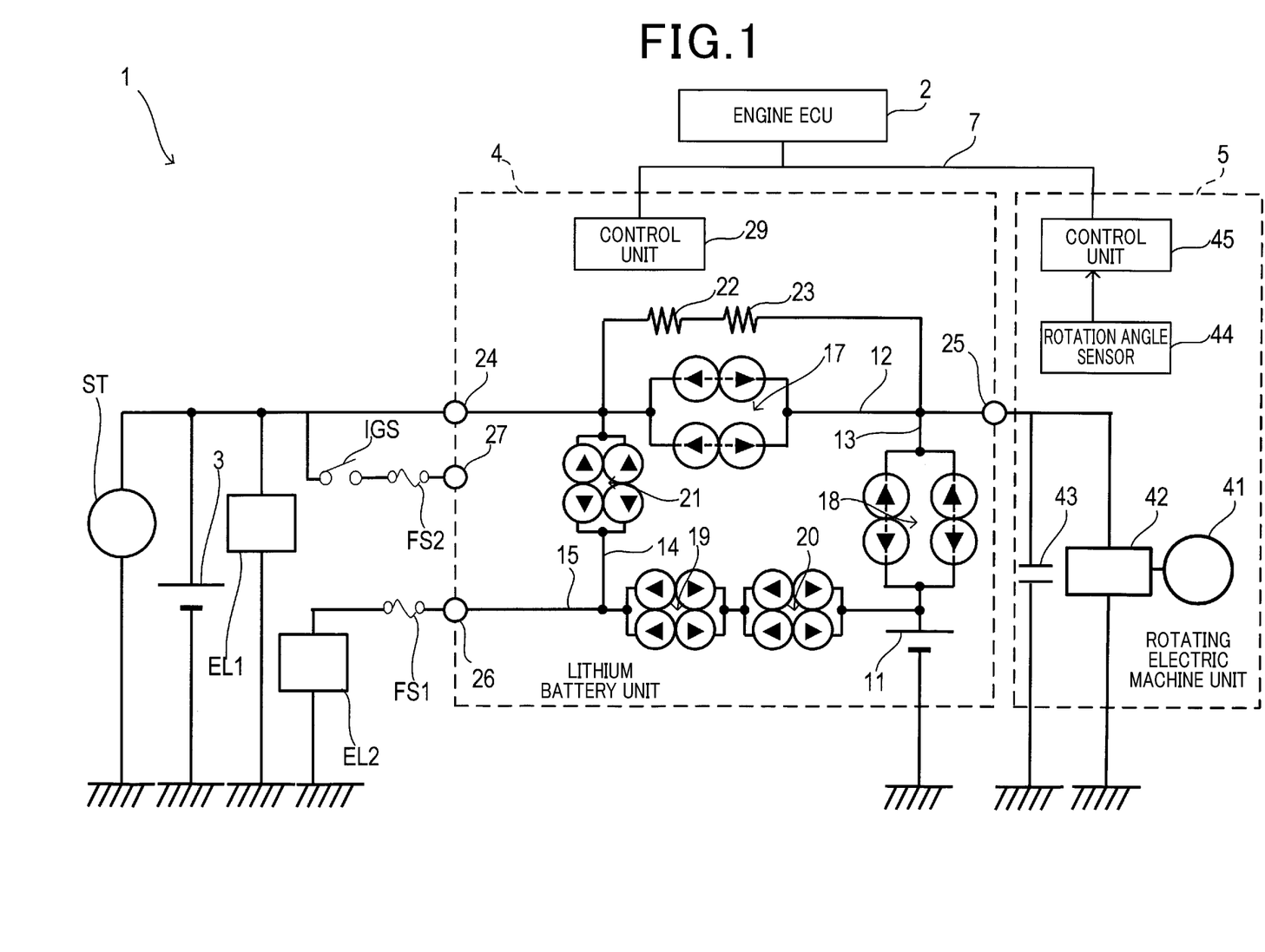
FIG. 1 is a block diagram of a configuration of a power supply system according to a first embodiment.

As shown in FIG. 1, a power supply system 1 according to the present embodiment is mounted to a vehicle and includes an engine electronic control unit (ECU) 2, a storage battery 3, a lithium battery unit 4, and a rotating electric machine unit 5.

The engine ECU 2 controls an engine (not shown) mounted to the vehicle. The engine ECU 2 is an electronic control apparatus that is mainly configured by a known microcomputer that includes a central processing unit (CPU), a ROM, a random access memory (RAM), and the like. Various functions of the microcomputer are implemented by the CPU executing a program that is stored in a non-transitory computer-readable storage medium. In this example, the ROM corresponds to the non-transitory computer-readable storage medium in which the program is stored. In addition, a method that corresponds to the program is performed as a result of the CPU executing the program. Some or all of the functions provided by the CPU may be configured by hardware, such as a single or a plurality of integrated circuits (ICs). In addition, the engine ECU 2 may be configured by a single or a plurality of microcomputers.

The storage battery 3 is a lead storage battery that can be charged and discharged. For example, a rated voltage of the storage battery 3 is set to 12 volts. The storage battery 3 supplies electric power to a starter ST and an electric load EL1, such as headlights.

The lithium battery unit 4 includes a storage battery 11, energization paths 12, 13, 14, and 15, switches 17, 18, 19, 20, and 21, limiting resistors 22 and 23, terminals 24, 25, 26, and 27, and a control unit 29.

The storage battery 11 is a lithium-ion storage battery that can be charged and discharged. For example, the rated voltage of the storage battery 11 is set to 12 volts. Compared to the lead storage battery, the lithium-ion storage battery has high charge/discharge energy efficiency and energy density.

The energization path 12 connects the terminal 24 and the terminal 25 such that a current flows therebetween. The energization path 13 connects a positive terminal of the storage battery 11 and the terminal 25 such that a current flows therebetween. The energization path 14 connects the terminal 24 and the terminal 26 such that a current flows therebetween. The energization path 15 connects the positive terminal of the storage battery 11 and the terminal 26 such that a current flows therebetween.

The switch 17 is arranged on the energization path 12. One end of the switch 17 is connected to the terminal 24 and the other end is connected to the terminal 25. The switch 17 is driven so as to be in either of an on state and an off state. In the on state, a current flows between the terminal 24 and the terminal 25, through the energization path 12. In the off state, a current does not flow between the terminal 24 and the terminal 25, through the energization path 12.

The switch 18 is arranged on the energization path 13. One end of the switch 18 is connected to the terminal 25 and the other end is connected to the positive terminal of the storage battery 11. The switch 18 is driven so as to be in either of an on state and an off state. In the on state, a current flows between the terminal 25 and the positive terminal of the storage battery 11, through the energization path 13. In the off state, a current does not flow between the terminal 25 and the positive terminal of the storage battery 11, through the energization path 13.

The switches 19 and 20 are connected in series to each other and arranged on the energization path 15. One end of the switch 19 on the side that is not connected to the switch 20 is connected to the terminal 26. One end of the switch 20 on the side than is not connected to the switch 19 is connected to the positive terminal of the storage battery 11. The switches 19 and 20 are driven so as to be in either of an on state and an off state. In the on state, a current flows between the terminal 26 and the positive terminal of the storage battery 11, through the energization path 15. In the off state, a current does not flow between the terminal 26 and the positive terminal of the storage battery 11, through the energization path 15.

The switch 21 is arranged on the energization path 14. One end of the switch 21 is connected to the terminal 24 and the other end is connected to the terminal 26. The switch 21 is driven so as to be in either of an on state and an off state. In the on state, a current flows between the terminal 24 and the terminal 26, through the energization path 14. In the off state, a current does not flow between terminal 24 and the terminal 26, through the energization path 14.

The switches 17, 18, 19, 20, and 21 each include four metal-oxide-semiconductor field-effect transistors (MOSFETs). Among the four MOSFETs, two MOSFETs are connected in series to each other to configure a first series-connection portion. The remaining two MOSFETs are connected in series to each other to configure second series-connection portion. The first series-connection portion and the second series-connection portion are connected in parallel to each other.

The limiting resistors 22 and 23 are connected in series to each other, and connected to the switch 17 in parallel. That is, one end of the limiting resistor 22 on the side that is not connected to the limiting resistor 23 is connected to the terminal 24. One end of the limiting resistor 23 that is not connected to the limiting resistor 22 is connected to the terminal 25.

The terminal 24 is connected to a positive terminal of the storage battery 3. The terminal 25 is connected to the rotating electric machine unit 5. The terminal 26 is connected to an electric load EL2, such as a navigation apparatus, via a fuse FS1. The terminal 27 is connected to the positive terminal of the storage battery 3, via a fuse FS2 and an ignition switch IGS (referred to, hereafter, as an IG switch IGS).

The control unit 29 controls the switches 17, 18, 19, 20, and 21. The control unit 29 communicates with the engine ECU 2 via a controller area network (CAN) bus 7, based on a CAN communication protocol. CAN is a registered trademark.

The control unit 29 is an electronic control apparatus that is mainly configured by a known microcomputer that includes a CPU, a ROM, a RAM, and the like. Various functions of the microcomputer are implemented by the CPU executing a program that is stored in a non-transitory computer-readable storage medium. In this example, the ROM corresponds to the non-transitory computer-readable storage medium in which the program is stored. In addition, a method that corresponds to the program is performed as a result of the CPU executing the program. Some or all of the functions provided by the CPU may be configured by hardware, such as a single or a plurality of ICs. In addition, the control unit 29 may be configured by a single or a plurality of microcomputers.

The rotating electric machine unit 5 includes a rotating electric machine 41, an inverter 42, a capacitor 43, a rotation angle sensor 44, and a control unit 45.

The rotating electric machine 41 is a three-phase alternating-current motor. A rotation shaft of the rotating electric machine 41 is drivably connected to a crankshaft of the engine by a belt. Thus, the rotation shaft of the rotating electric machine 41 is rotated by the rotation of the crankshaft.

The inverter 42 is a known three-phase bridge circuit that includes six switching elements. The inverter 42 converts a direct-current voltage outputted from the terminal 25 of the lithium battery unit 4 to a three-phase alternating current and drives the rotating electric machine 41 with the three-phase alternating current of a U phase, a V phase, and a W phase. In addition, the inverter 42 converts the alternating-current voltages outputted from the U phase, the V phase, and the W phase of the rotating electric motor 41 as a result of the rotation of the rotating electric machine 41 to a direct-current voltage, and outputs the direct-current voltage to the lithium battery unit 4.

One end of the capacitor 43 is connected to the terminal 25 of the lithium battery unit 4 and the other end is grounded.

The rotation angle sensor 44 is attached to the rotation shaft of the rotating electric machine 41. The rotation angle sensor 44 detects a rotation angle of the rotating electric machine 41. The rotation angle sensor 44 outputs a detection signal indicating a detection result to the control unit 45.

The control unit 45 controls the inverter 42. The control unit 45 communicates with the engine ECU 2 via the CAN bus 7, based on the CAN communication protocol.

The control unit 45 is an electronic control apparatus that is mainly configured by a known microcomputer that includes a CPU, a ROM, a RAM, and the like. Various functions of the microcomputer are implemented by the CPU executing a program that is stored in a non-transitory computer-readable storage medium. In this example, the ROM corresponds to the non-transitory computer-readable storage medium in which the programs are stopped. In addition, a method that corresponds to the program is performed as a result of the CPU executing the program. Some or all of the functions provided by the CPU may be configured by hardware, such as a single or a plurality of ICs. In addition, the control unit 45 may be configured by a single or a plurality of microcomputers.

Figure 2:
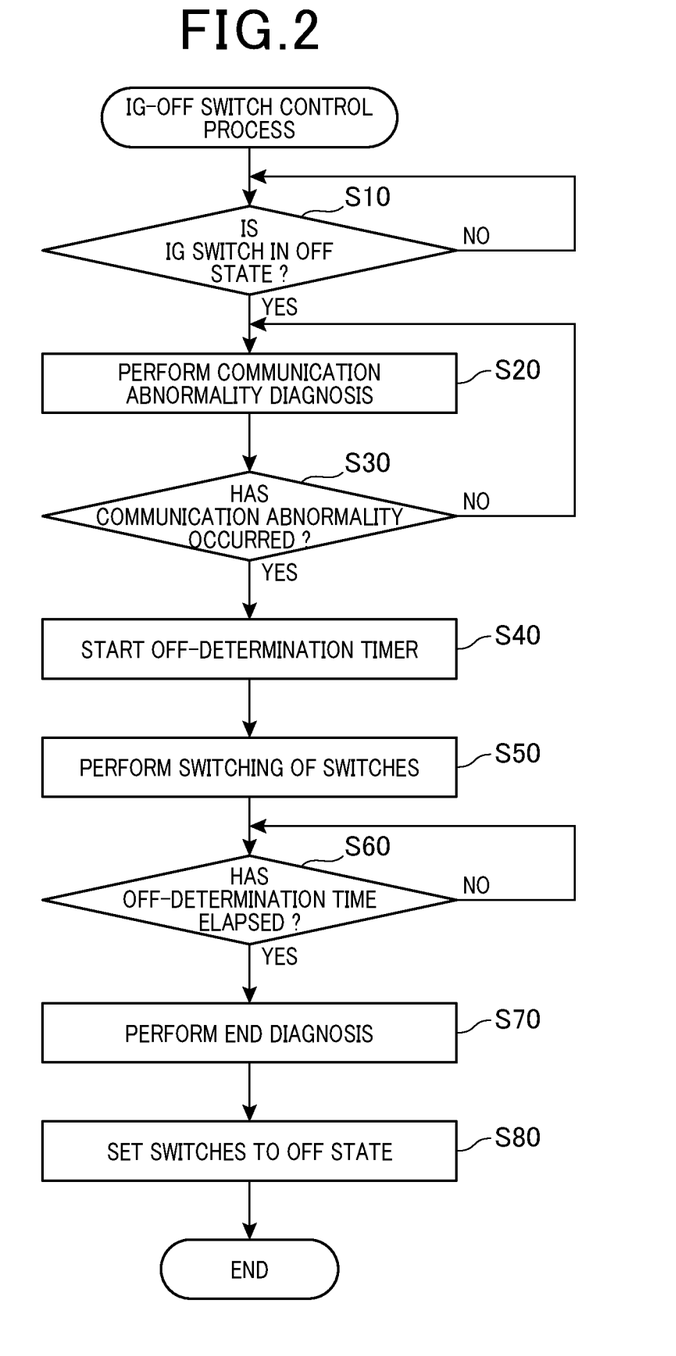
FIG. 2 is a flowchart of an IG-off switch control process according to the first embodiment.

Next, the steps in an IG-off switch control process that is performed by the control unit 29 of the lithium battery unit 4 will be described. The IG-off switch control process is started immediately after the control unit 29 is started.

When the IG-off switch control process is performed, as shown in FIG. 2, first, at step S10, the control unit 29 determines whether the IG switch IGS is in the off state. Here, when determined that the IG switch IGS is in the on state (i.e., NO at step S10), the control unit 29 waits until the IG switch IGS is in the off-state by repeatedly performing the process at step S10.

Then, when determined that the IG switch IGS is in the off state (i.e., YES at step S10), at step S20, the control unit 29 performs a diagnosis regarding communication abnormality. Specifically, the control unit 29 determines that a communication abnormality has occurred in the communication with the engine ECU 2 when a state in which data transmitted from the engine ECU 2 has not been received continues for a period of time, that is, a predetermined communication abnormality determination time (such as 2 seconds).

Furthermore, at step S30, the control unit 29 determines whether a communication abnormality has occurred based on the diagnosis result at step S20. Here, when determined that a communication abnormality has not occurred (i.e, NO at step S30), the control unit 29 proceeds to step S20.

Meanwhile, when determined that a communication abnormality has occurred (i.e, YES at step S30), at step S40, the control unit 29 starts an off-determination timer that is provided in the RAM of the control unit 29. For example, the off-determination timer is incremented every 1 millisecond. When the off-determination timer is started, the value of the off-determination timer is incremented from 0 (that is, 1 is added to the value of the off-determination timer).

Then, at step S50, the control unit 29 performs switching of the switches 17, 18, 19, 20, and 21. Specifically, the control unit 29 switches the switches 17 and 21 to the on state, and switches the switches 18, 19, and 20 to the off state.

Subsequently, at step S60, the control unit 29 determines whether a predetermined off-determination time T1 (such as 5 to 10 seconds) has elapsed. Specifically, the control unit 29 determines whether the value of the off-determination timer is equal to or greater than a value that corresponds to the off-determination time T1. Here, when determined that the off-determination time T1 has not elapsed (i.e, NO at step S60), the control unit 29 waits until the off-determination time T1 elapses by repeatedly performing the process at step S60.

Then, when determined that the off-determination time T1 has elapsed (i.e, YES at step S60), at step S70, the control unit 29 performs an end diagnosis (termination diagnosis). In the end diagnosis, the control unit 20 confirms whether the switches 17 to 21 have been switched between the on state and the off state as commanded.

Then, upon completion of the end diagnosis, at step S80, the control unit 29 sets the switches 17 to 21 to the off state and ends the IG-off switch control process.

Figure 3:
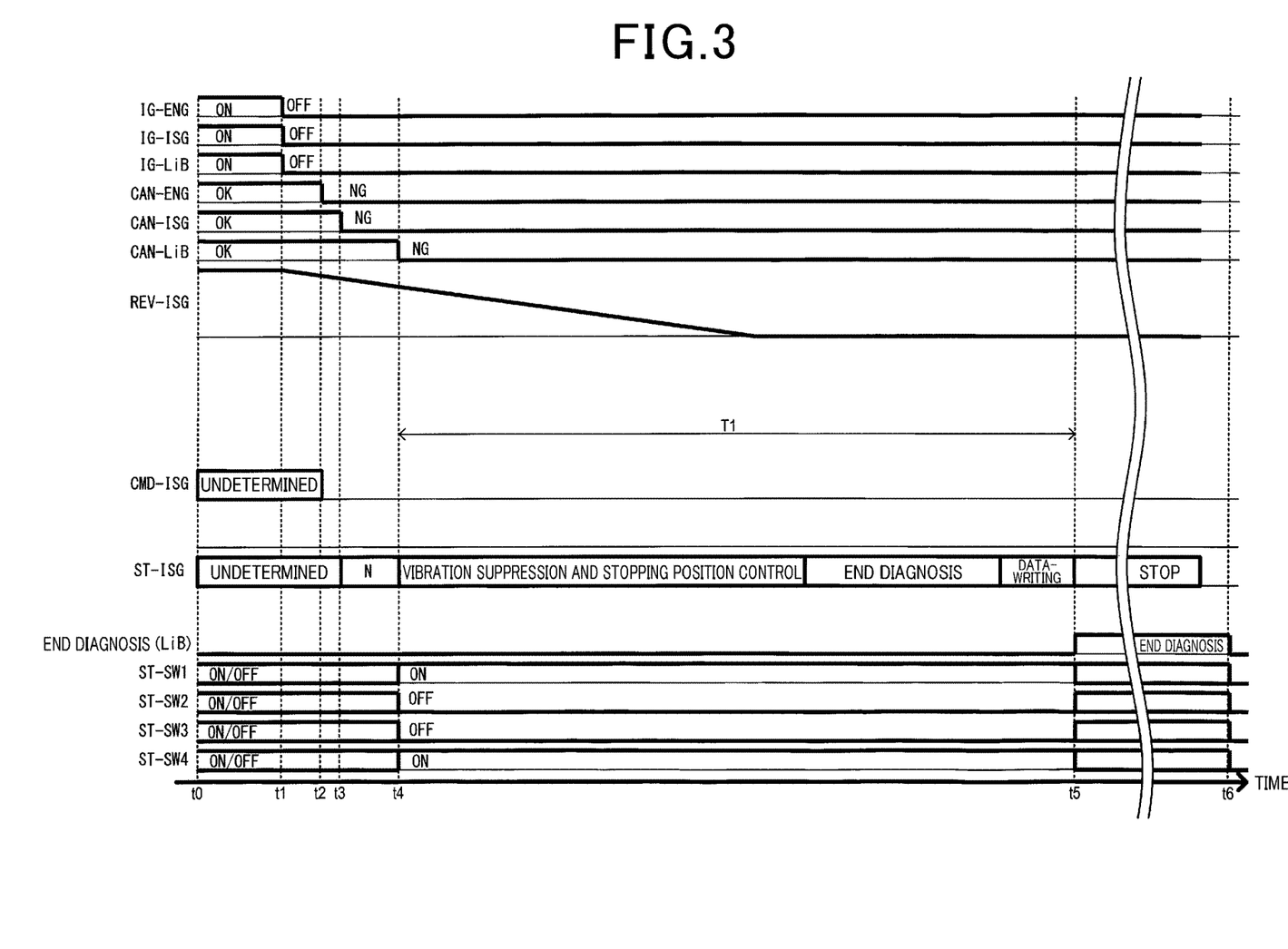
FIG. 3 is a timing chart of a specific example of operations of the power supply system.

FIG. 3 is a timing chart of a specific example of the operations of the power supply system 1 when the IG switch IGS is switched from the on state to the off state.

As shown in FIG. 3, for example, after the IG switch IGS is switched to the on state, a battery voltage is supplied to the engine ECU 2, the control unit 29 of the lithium battery unit 4, and the control unit 45 of the rotating electric machine unit 5 from the storage battery 3.

In FIG. 3, IG-ENG indicates the voltage supply state of the engine ECU 2. IG-ISG indicates the voltage supply state of the control unit 45 of the rotating electric machine unit 5. IG-LiB indicates the voltage supply state of the control unit 29 of the lithium battery unit 4. A B+ voltage is supplied to the control unit 29 of the lithium battery unit 4. Therefore, the control unit 29 can operate even when the IG switch IGS is in the off state. As shown in FIG. 3, at time t0, IG-ENG IG-ISG and IG-LiB are set to ON.

For example, at time t0, the engine ECU 2, the control unit 29 of the lithium battery unit 4, and the control unit 45 of the rotating electric machine unit 5 are capable of CAN communication. In FIG. 3, CAN-ENG indicates the CAN communication state of the engine ECU 2. CAN-ISG indicates the CAN communication state of the control unit 45 of the rotating electric machine unit 5. CAN-LiB indicates the CAN communication state of the control unit 28 of the lithium battery unit 4. As shown in FIG. 3, at time t0, CAN-ENG CAN-ISG and CAN-LiB are set to OK.

For example, at time t0, the engine ECU 2 is in an undetermined state in which the content of a command to the rotating electric machine unit 5 is undetermined. In FIG. 3, CMD-ISG indicates a command state of the command to the control unit 45 of the rotating electric machine unit 5 from the engine ECU 2. Thus, at time t0, the state of the rotating electric machine unit 5 is undetermined. In FIG. 3, ST-ISG indicates a state of the rotating electric machine unit 5.

For example, at time t0, the switches 17 to 21 are in an undetermined state in which whether the switches 17 to 21 are in the on state or the off state is undetermined. In FIG. 3, ST-SW1 indicates the state of the switch 17. ST-SW2 indicates the state of the switch 18. ST-SW3 indicates the state of the switches 19 and 20. ST-SW4 indicates the state of the switch 21. As shown in FIG. 3, at time t0, ST-SW1, ST-SW2, ST-SW3, and ST-SW4 are each set to ON/OFF.

Then, for example, at time t1, the IG switch IGS is switched from the on state to the off state. As a result, the supply of battery voltage from the storage battery 3 via the ignition switch IGS is stopped. As shown in FIG. 3, at time t1, IG-ENG IG-ISG and IG-LiB are changed from ON to OFF.

In addition, as a result of the IG switch IGS being switched from the on state to the off state, a rotation speed of the rotating electric machine 41 decreases. In FIG. 3, REV-ISG indicates the rotation frequency of the rotating electric machine 41.

Then, for example, at time t2, the engine ECU 2 recognizes that CAN communication with the rotating electric machine unit 5 or the lithium battery unit 4 cannot be performed. As shown in FIG. 3, at time t2, CAN-ENG is changed from OK to NG In addition, for example, at time t3, the control unit 45 of the rotating electric machine unit 5 recognizes that CAN communication with the engine ECU 2 cannot be performed. As a result, the control unit 45 of the rotating electric machine unit 5 transitions to a neutral state. As shown in FIG. 3, at time t3, ST-ISG changes from undetermined to N that indicates neutral.

Subsequently, the control unit 45 of the rotating electric machine unit 5 successively performs vibration suppression control, stopping position control, end diagnosis, and data-writing.

In vibration suppression control, the control unit 45 drives the rotating electric machine 41 to suppress vibrations that are generated due to resonance in the engine when the engine rotation speed decreases as a result of the IG switch IGS switching from the on state to the off state.

Specifically, in vibration suppression control, the control unit 45 rapidly decreases the engine rotation speed by driving the rotating electric machine 41 that is connected to the crankshaft of the engine. The control unit 45 shortens a period during which the engine rotation speed is included in a resonance range and thereby suppresses the generation of vibrations in the engine.

In stopping position control, the control unit 45 drives the rotating electric machine 41 such that the engine stops at a predetermined crank angle.

In the end diagnosis, the control unit 45 confirm whether the switching elements of the inverter 42 are switched between the on state and the off state as commanded.

In data-writing, the control unit 45 writes data in a flash ROM that is a non-volatile memory of which the stored contents can be rewritten.

Furthermore, for example, at time t4, the control unit 29 of the lithium battery unit 4 recognizes that CAN communication with the engine ECU 2 cannot be performed. In FIG. 3, at time t4, CAN-LiB changes from OK to NG. At this time, the control unit 29 of the lithium battery unit 4 switches the switches 17 and 21 to the on state and the switches 18, 19, and 20 to the off state. As shown in FIG. 3, at time t4, ST-SW1, ST-SW2, ST-SW3, and ST-SW4 are respectively set to ON, OFF, OFF, and ON.

Then, at time t5 after the elapse of the off-determination time T1 from time t4, the control unit 29 of the lithium battery unit 4 performs the end diagnosis. At time t5, the control unit 45 of the rotating electric machine unit 5 completes vibration suppression control, stopping position control, the end diagnosis, and data-writing, and stops the rotating electric machine 41.

Subsequently, for example, at time t6 upon completion of the end diagnosis, the control unit 29 of the lithium battery unit 4 sets the switches 17 to 21 to the off state.

The control unit 29 configured as described above is an electronic control apparatus that is used in the power supply system 1 that includes the rotating electric machine 41, the inverter 42, the control unit 45, the storage battery 3, the storage battery 11, the switch 17, the switch 18, the control unit 29, and the engine ECU 2.

The rotation shaft of the rotating electric machine 41 is connected to the crankshaft of the engine of the vehicle. The inverter 42 configures a drive circuit that drives the rotating electric machine 41 by adjusting the electric power supplied to the rotating electric machine 41. The control unit 45 controls at least power generation using the rotating electric machine 41. The storage battery 3 and the storage battery 11 are connected in parallel to the rotating electric machine 41. The switch 17 is arranged on the energization path 12 that electrically connects the rotating electric machine 41 and the storage battery 3. The switch 17 is switched to either of the on state in which the energization path 12 is electrically conductive and the off state in which the energization path 12 is not electrically conductive. The switch 18 is arranged on the energization path 13 that electrically connects the rotating electric machine 41 and the storage battery 11. The switch 18 is switched to either of the on state in which the energization path 13 is electrically conductive and the off state in which the energization path 13 is not electrically conductive.

The control unit 29 controls switching between the on state and the off state of the switches 17 and 18. The engine ECU 2 is communicably connected to the control unit 45 and the control unit 29. The engine ECU 2 controls the control unit 45 and the control unit 29.

Then, after the IG switch IGS is switched from the on state to the off state, the control unit 29 determines whether a predetermined process completion condition is met, without communicating with the engine ECU 2. The process completion condition indicates that vibration suppression control, stopping position control, the end diagnosis, and data-writing (referred to, hereafter, as the switch-off process) performed by the control unit 45 after the IG switch IGS has been switched from the on state to the off state has been completed.

Furthermore, the control unit 29 maintains the switch 17 in the on state until the process completion condition is determined to be met after the IG switch IGS has been switched from the on state to the off state.

In this manner, even when an abnormality occurs in the communication with the engine ECU 2 and the voltage-supply-stop command cannot be acquired from the engine ECU 2, the control unit 29 can maintain the switch 17 in the on state until the switch-off process is completed and then switch the switch 17 to the off state after the switch-off process is completed.

Therefore, the control unit 29 can supply the voltage required for the control unit 45 to perform the switch-off process after the IG switch IGS is switched from the on state to the off state. In addition, the control unit 29 can suppress depletion or degradation of the storage battery 3 caused by a communication abnormality.

In addition, the process completion condition is that the predetermined off-determination time T1 has elapsed from the occurrence of an interruption in the communication between the control unit 29 and the engine ECU 2, after the IG switch IGS is switched from the on state to the off state. Therefore, the control unit 29 can easily determine whether the switch-off process is completed.

According to the embodiment described above, the control unit 45 corresponds to a power generation control unit. The storage battery 3 corresponds to a first storage battery. The storage battery 11 corresponds to a second storage battery. The switch 17 corresponds to a first switch. The switch 18 corresponds to a second switch.

In addition, the control unit 29 corresponds to a switch control unit. The engine ECU 2 corresponds to a host control unit. S40 and S60 correspond to processes serving as a completion determining unit. S10 to S80 correspond to processes serving as an on-maintaining unit.

Furthermore, the crankshaft corresponds to an output shaft. The energization path 12 corresponds to a first energization path. The on state of the switch 17 corresponds to a first conduction state. The off state of the switch 17 corresponds to a first non-conduction state. The energization path 13 corresponds to a second energization path. The on state of the switch 18 corresponds to a second conduction state. The off stat of the switch 18 corresponds to a second non-conduction state. The determination condition at S60 corresponds to the process completion condition.

Second Embodiment

A second embodiment of the present disclosure will be described below with reference to the drawings. According to the second embodiment, sections differing from those according to the first embodiment will be described. Common configurations are given the same reference numbers.

The power supply system 1 according to the second embodiment differs from that according to the first embodiment in that the IG-off switch control process is modified.

Figure 4:
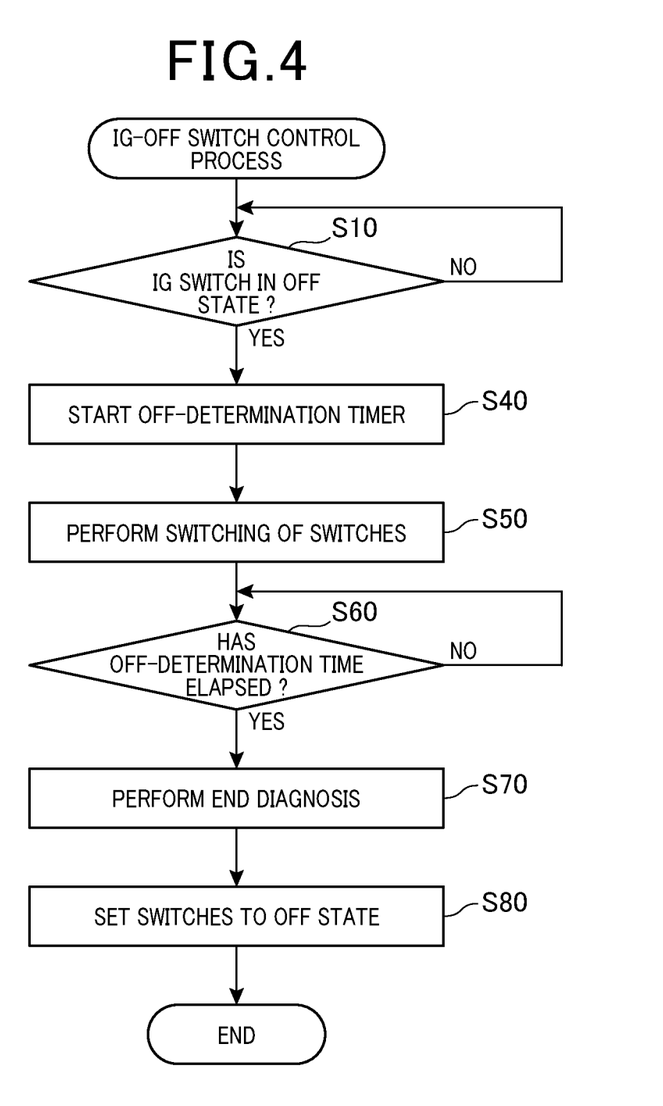
FIG. 4 is a flowchart of an IG-off switch control process according to a second embodiment.

The IG-off switch control process according to the second embodiment differs from that according to the first embodiment in that the processes at steps S20 and S30 are omitted.

That is, in the IG-off switch control process according to the second embodiment, as shown in FIG. 4, at step S10, the control unit 29 proceeds to step S40 when determined that the IG switch IGS is in the off state.

In the control unit 29 of the lithium battery unit 4 configured as described above, the process completion condition is that the off-determination time T1 has elapsed from when the IG switch IGS is switched from the on state to the off state. Therefore, the control unit 29 can easily determine whether the switch-off process is completed.

According to the embodiment described above, steps S40 and S60 correspond to processes serving as the completion determining unit. Steps S10 and S40 to S80 correspond to processes serving as the on-maintaining unit. The determination condition at step S60 corresponds to the process completion condition.

Third Embodiment

A third embodiment of the present disclosure will be described below with reference to the drawings. According to the third embodiment, sections that differ from those according to the second embodiment will be described. Common configurations are given the same reference numbers.

The power supply system 1 according to the third embodiment differs from that according to the second embodiment in that a time measurement process, a time notification process, and a determination-time setting process are added.

Figure 5:
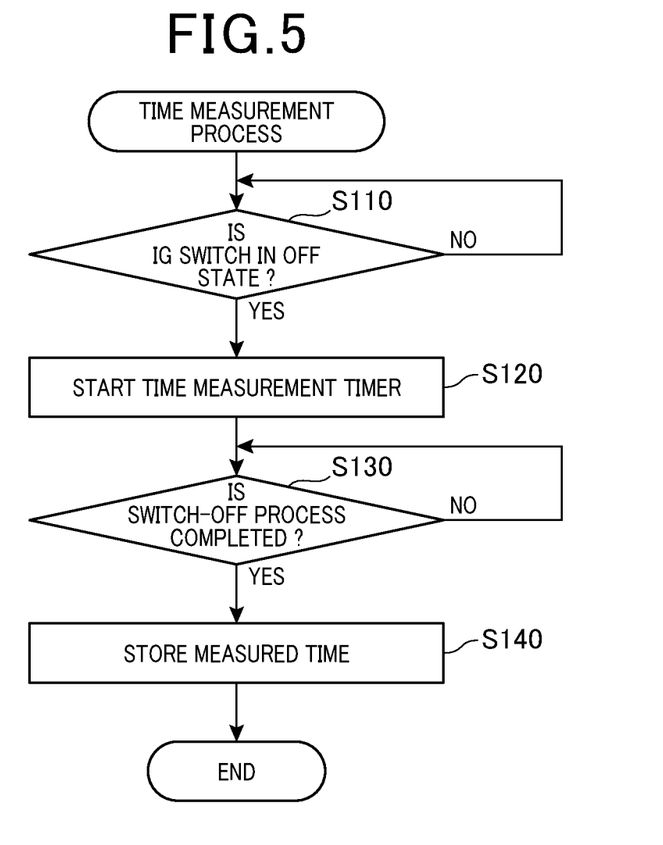
FIG. 5 is a flowchart of a time measurement process according to a third embodiment.

First, the steps in the time measurement process performed by the control unit 45 of the rotating electric machine unit 5 will be described. The time measurement process is started immediately after the control unit 45 is started.

When the time measurement process is performed, as shown in FIG. 5, first, at step S110, the control unit 45 determines whether the IG switch IGS is in the off state. Here, when the IG switch IGS is in the on state (i.e, NO at step S110), the control unit 45 waits until the IG switch IGS is in the off state by repeatedly performing the process at step S110.

Then, when determined that the IG switch IGS is in the off state (i.e, YES at step S110), at step S120, the control unit 45 starts a time measurement timer that is provided in the RAM of the control unit 45. For example, the time measurement timer is incremented every 1 millisecond. When the time measurement timer is started, the value of the time measurement timer is incremented from 0.

Furthermore, at step S130, the control unit 45 determines whether the switch-off process is completed. As described above, the switch-off process is vibration suppression control, stopping position control, the end diagnosis, and data-writing performed by the control unit 45.

Here, when determined that the switch-off process is not completed (i.e, NO at step S130), the control unit 45 waits until the switch-off process is completed by repeatedly performing the process at step S130. Then, when determined that the switch-off process is completed (i.e, YES at step S130), at step S140, the control unit 45 stores the value of the time measurement timer as measurement time in a non-volatile memory that is provided in the control unit 45. The control unit 45 then ends the time measurement process.

Figure 6:
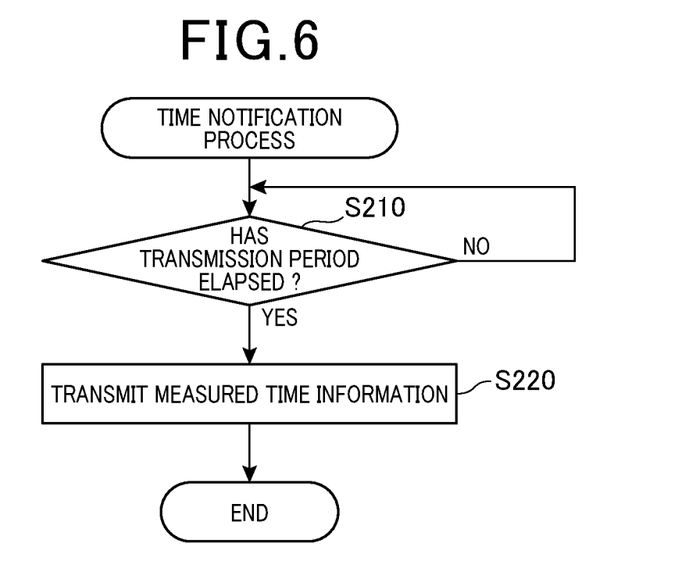
FIG. 6 is a flowchart of a time notification process according to the third embodiment.

Next, the steps in the time notification process performed by the control unit 45 of the rotating electric machine unit 5 will be described. The time notification process is repeatedly performed while the control unit 45 is operating.

When the time notification process is performed, as shown in FIG. 6, first, at step S210, the control unit 45 determines whether a predetermined transmission period (such as 60 seconds) has elapsed. Here, when determined that the transmission period has not elapsed (i.e, NO at step S210), the control unit 45 waits until the transmission period elapses by repeatedly performing the process at step S210.

Then, when determined that the transmission period has elapsed (i.e, YES at step S210), at step S220, the control unit 45 transmits measured time information that indicates the measured time stored in the non-volatile memory to the control unit 29 of the lithium battery unit 4. The control unit 45 then temporarily ends the time notification process.

Figure 7:
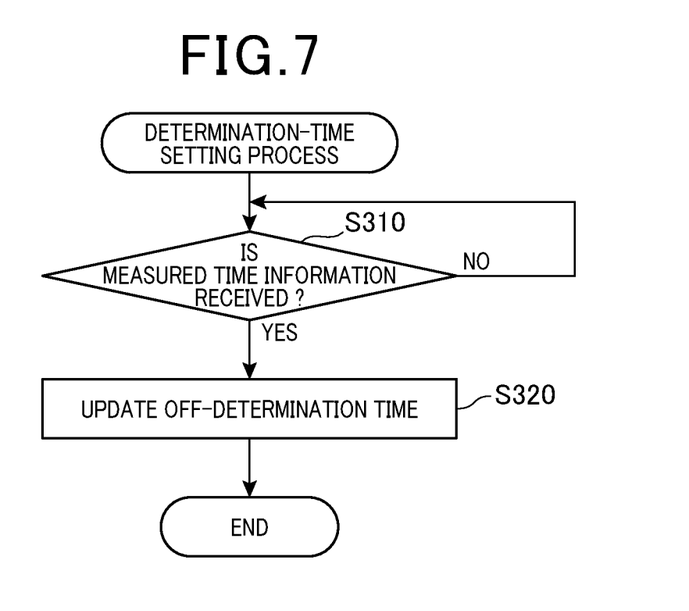
FIG. 7 is a flowchart of a determination-time setting process according to the third embodiment.

Next, the steps in the determination-time setting process performed by the control unit 29 of the lithium battery unit 4 will be described. The determination-time setting process is repeatedly performed while the control unit 29 is operating.

When the determination-time setting process is performed, as shown in FIG. 7, first, at step S310, the control unit 29 determines whether the measured time information has been received from the control unit 45 of the rotating electric machine unit 5. Here, when determined that the measured time information has not been received (i.e, NO at step S310), the control unit 29 waits until the measured time information has been received by repeatedly performing the process at S310.

Then, when determined that the measured time information has been received (i.e, YES at step S310), at step S320, the control unit 29 updates the off-determination time T1 with a product obtained by multiplying the measured time indicated by the received measured time information with a calculation coefficient (such as 1.2) as the new off-determination time T1. The calculation coefficient is set to be greater than 1. The control unit 29 then temporarily ends the determination-time setting process.

The control unit 29 of the lithium battery unit 4 configured as described above sets the off-determination time T1 based on the amount of time that is required for the switch-off process that has been performed upon completion of the most recent driving cycle. The driving cycle refers to a period from when the IG switch IGS is switched from the on state to the off state until the IG switch IGS is next switched from the on state to the off state.

As a result, the control unit 29 can set the off-determination time T1 based on the amount of time required for the previous switch-off process. Therefore, the control unit 29 can suppress the occurrence of a situation in which the off-determination time T1 is excessively long in relation to the actual amount of time required for the switch-off process. The control unit 29 can optimize the off-determination time T1.

According to the embodiment described above, steps S310 and S320 correspond to processes serving as a driving cycle setting unit.

Fourth Embodiment

A fourth embodiment of the present disclosure will be described below with reference to the drawings. According to the fourth embodiment, sections that differ from those according to the first embodiment will be described. Common configurations are given the same reference numbers.

The power supply system 1 according to the fourth embodiment differs from that according to the first embodiment in that a time estimation process and a determination-time setting process are added.

Figure 8:
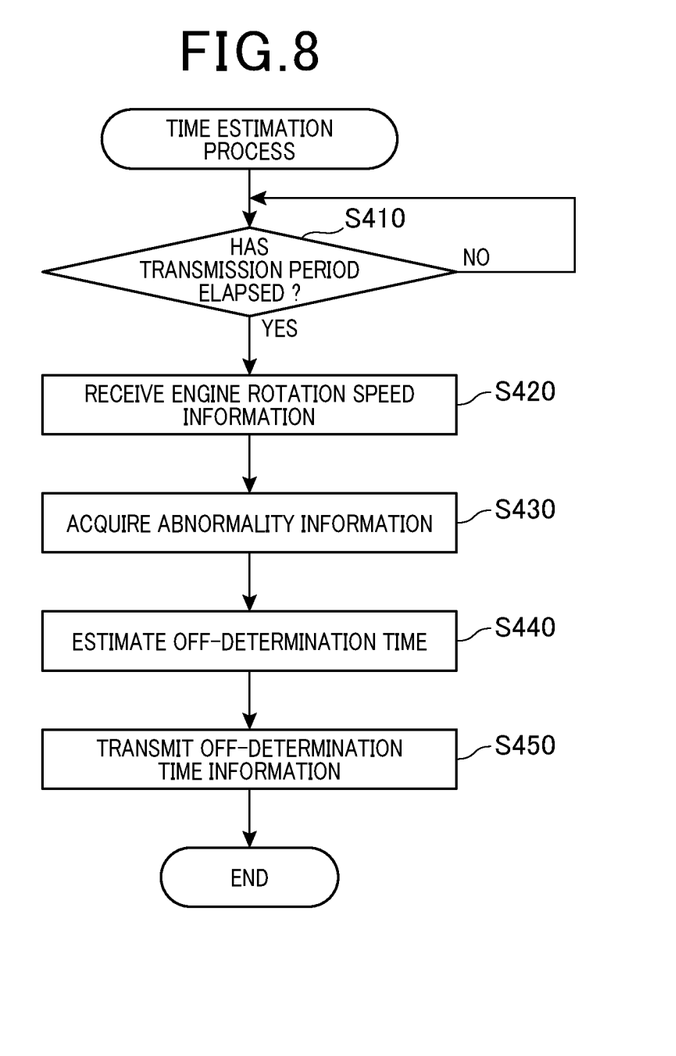
FIG. 8 is a flowchart of a time estimation process according to a fourth embodiment.

First, the steps in the time estimation process performed by the control unit 45 of the rotating electric machine unit 5 will be described. The time estimation process is repeatedly performed while the control unit 45 is operating.

When the time estimation process is performed, as shown in FIG. 8, first, at step S410, the control unit 45 determines whether a predetermined transmission period (such as 60 seconds) has elapsed. Here, when determined that the transmission period has not elapsed (i.e, NO at step S410), the control unit 45 waits until the transmission period elapses by repeatedly performing the process at step S410.

Then, when determined that the transmission period has elapsed (i.e, YES at step S410), at step S420, the control unit 45 receives engine rotation speed information from the engine ECU 2. The engine rotation speed information indicates the engine rotation speed. Furthermore, at step S430, the control unit 45 acquires abnormality information that is stored in the non-volatile memory of the control unit 45. The control unit 45 periodically determines whether an abnormality has occurred in the rotating electric machine unit 5 and stores the abnormality information indicating the content of the abnormality that has occurred in the non-volatile memory.

Next, at step S440, the control unit 45 estimates the off-determination time based on the engine rotation speed indicated by the engine rotation speed information received at step S420 and the number of abnormalities indicated by the abnormality information. For example, the control unit 45 references a three-dimensional map in which the off-determination time is predetermined using, as parameters, the engine rotation speed and the number of abnormalities, and thereby determines the off-determination time. The amount of time required for vibration suppression control is dependent on the engine rotation speed. The amount of time required for data-writing is dependent on the number of abnormalities.

Then, at step S450, the control unit 45 transmits off-determination time information indicating the off-determination time estimated at step S440 to the control unit 29 of the lithium battery unit 4. The control unit 45 temporarily ends the time estimation process.

Figure 9:
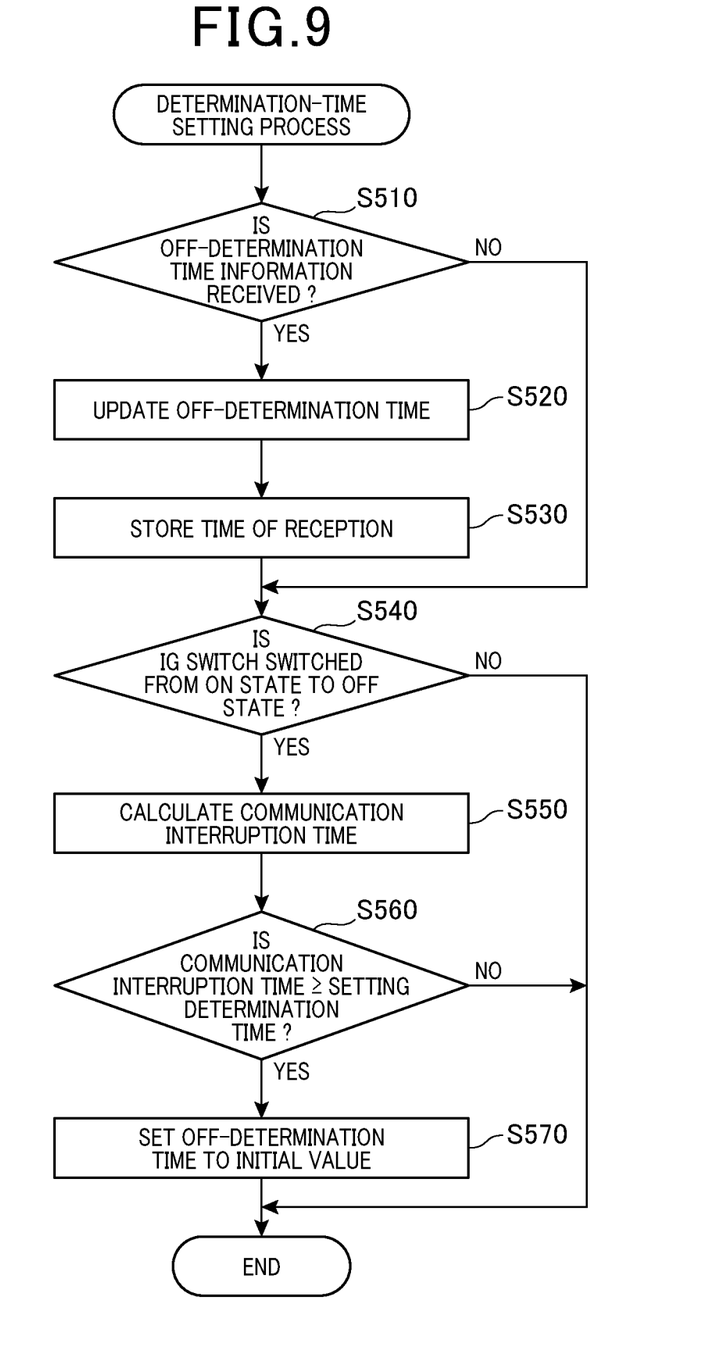
FIG. 9 is a flowchart of a determination-time setting process according to the fourth embodiment.

Next, the steps in the determination-time setting process performed by the control unit 29 of the lithium battery unit 4 will be described. The determination-time setting process is repeatedly performed while the control unit 29 is operating.

When the determination-time setting process is performed, as shown in FIG. 9, first, at step S510, the control unit 29 determines whether the off-determination time information has been received from the control unit 45 of the rotating electric machine unit 5. Here, when determined that the off-determination time information has not been received (i.e, NO at step S510), the control unit 29 proceeds to step S540.

Meanwhile, when determined that the off-determination time information has been received (i.e, YES at step S510), at step S520, the control unit 29 updates the off-determination time T1 with a value indicated by the off-determination time information received at S510 as the new off-determination time T1. Furthermore, the control unit 29 stores a time of reception of the off-determination time information received at step S510 in the RAM and proceeds to S540.

Then, upon proceeding to step S540, the control unit 29 determines whether the IG switch IGS is switched from the on state to the off state. Here, when determined that the IG switch IGS is not switched from the on state to the off state (i.e, NO at step S540), the control unit 29 temporarily ends the determination-time setting process.

Meanwhile, when determined that the IG switch IGS is switched from the on state to the off state (i.e, YES at step S540), at step S550, the control unit 29 calculates, as a communication interruption time, a difference between the newest time of reception stored in the RAM and a current time.

Then, at step S560, the control unit 29 determines whether the communication interruption time calculated at step S550 is equal to or greater than a predetermined setting determination time. Here, when determined that the communication interruption time is less than the setting determination time (i.e, NO at step S560), the control unit 29 temporarily ends the determination-time setting process.

Meanwhile, when determined that the communication interruption time is equal to or greater than the setting determination time (i.e, YES at step S560), at step S570, the control unit 29 sets the off-determination time T1 to a predetermined initial value. The control unit 29 then temporarily ends the determination-time setting process.

When the off-determination time information that indicates the amount of time required for the switch-off process has been received from the control unit 45 of the rotating electric machine unit 5, the control unit 29 of the lithium battery unit 4 configured as described above sets the off-determination time T1 based on the received off-determination time information.

As a result, the control unit 29 can make the control unit 45 of the rotating electric machine unit 5 estimate the amount of time required for the switch-off process, and set the off-determination time T1 based on the estimation result. Therefore, the control unit 29 can suppress the occurrence of a situation in which the off-determination time T1 is excessively long in relation to the actual amount of time required for the switch-off process. The control unit 29 can optimize the off-determination time T1.

In addition, the control unit 29 sets the off-determination time T1 to a predetermined initial value when communication with the control unit 45 is interrupted. Therefore, the control unit 29 can determine whether the process completion condition is met based on the off-determination time T1, even when communication with the control unit 45 is interrupted.

According to the embodiment described above, steps S510 to S570 correspond to processes serving as a reception setting unit. The control unit 45 corresponds to a transmission source. The off-determination time information corresponds to processing time information.

Fifth Embodiment

A fifth embodiment of the present disclosure will be described below with reference to the drawings. According to the fifth embodiment, sections that differ from those according to the first embodiment will be described. Common configurations are given the same reference numbers.

Figure 10:
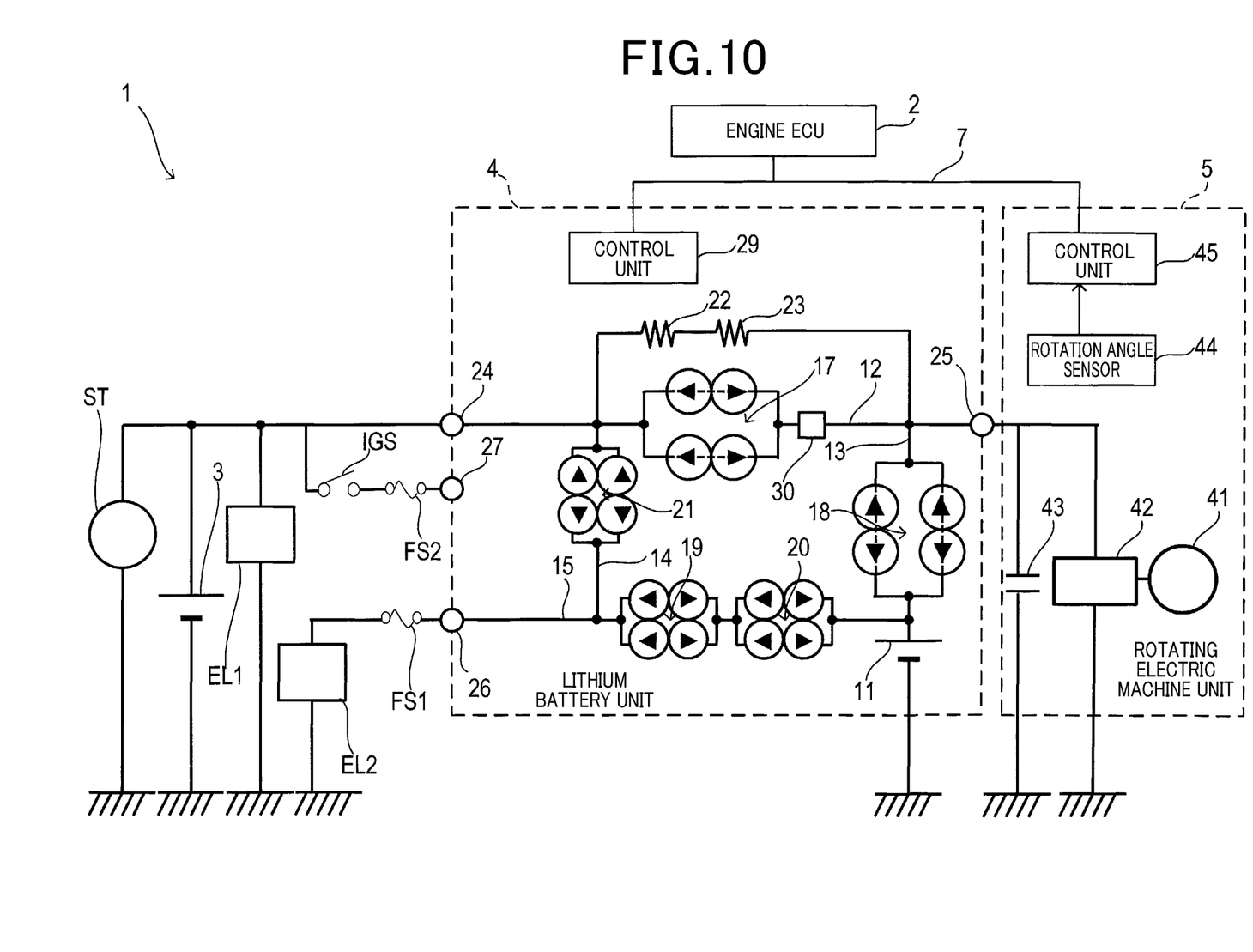
FIG. 10 is a block diagram of a configuration of a power supply system according to a fifth embodiment.
Figure 11:
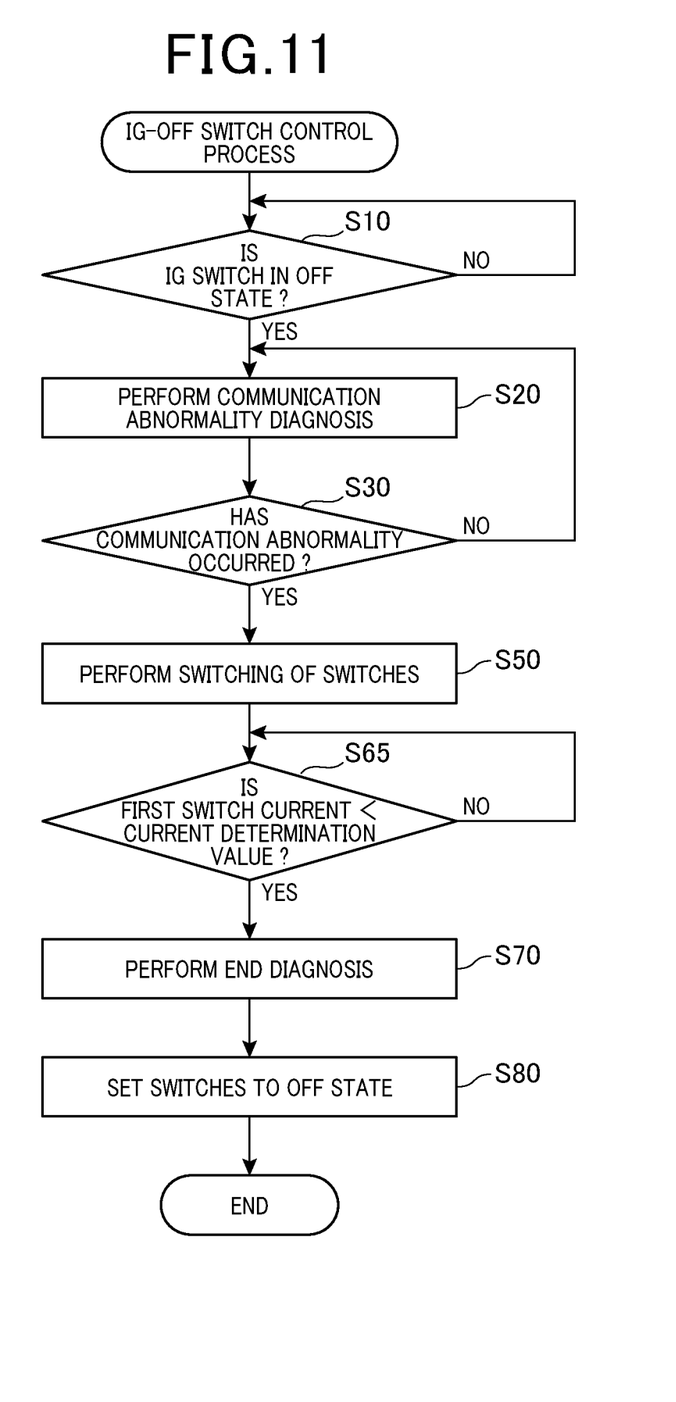
FIG. 11 is a flowchart of an IG-off switch control process according to a fifth embodiment.

The power supply system 1 according to the fifth embodiment differs from that according to the first embodiment in that a current detection circuit 30 is added and the IG-off switch control process is modified.

As shown in FIG. 10, the lithium battery unit 4 further includes the current detection circuit 30. The current detection circuit 30 arranged on the energization path 21 and detects the current that flows to the switch 17.

In addition, the IG-off switch control process according to the fifth embodiment differs from that according to the first embodiment in that the process at step S40 is omitted and a process at S65 is performed instead of the process at step S60.

That is, as shown in FIG. 11, when determined at a communication abnormality has occurred at step S30, the control unit 29 proceeds to step S50. In addition, upon completion of the process at step S50, at step S65, the control unit 29 determines whether the current (referred to, hereafter, as a first switch current) detected by the current detection circuit 30 is less than a predetermined current determination value.

Here, when determined that the first switch current is equal to or greater than the current determination value (i.e, NO at step S65), the control unit 29 waits until the first switch current becomes less than the current determination value by repeatedly performing the process at step S65. Then, when determined that the first switch current is less than the current determination value (i.e, YES at step S65), the control unit 29 proceeds to step step S70.

The control unit 29 of the lithium battery unit 4 configured as described above determines whether the process completion condition is met based on the current of the switch 17. Therefore, the control unit 29 can determine whether the process completion condition is met based only on the information related to the lithium battery unit 4.

According to the embodiment described above, step S65 corresponds to a process serving as a completion determining unit. The determination condition at step S65 corresponds to the process completion condition.

Embodiments of the present disclosure are described above. However, the present disclosure is not limited to the above-described embodiments. Various modifications are possible.

First Variation Example

For example, according to the above-described embodiments, after the IG switch IGS is switched from the on state to the off state, the switch 17 is maintained in the on state until the off-determination time T1 elapses from the occurrence of a communication abnormality between the control unit 29 and the engine ECU 2. However, the switch 17 may be maintained in the on state until a predetermined amount of time elapses from when the IG switch IGS is switched from the on state to the off state.

Second Variation Example

According to the above-described fourth embodiment, the control unit 45 of the rotating electric machine unit 5 estimates the off-determination time. However, the engine ECU 2 may estimate the off-determination time.

Third Variation Example

According to the above-described fifth embodiment, whether the first switch current is less than the current determination value is determined. However, it may be determined whether a voltage of the switch 17 is less than a predetermined voltage determination value, based on a detection result from a voltage detection circuit that detects the voltage of the switch 17.

In addition, function provided by a single constituent element according to the above-described embodiments may be divided among a plurality of constituent elements. Functions provided by a plurality of constituent elements may be provided by a single constituent element. Furthermore, a part of a configuration according to the above-described embodiments may be omitted. Moreover, at least a part of a configuration according to an above-described embodiment may be added to or replace a configuration according to another of the above-described embodiments. Any mode included in the technical concept specified by the wordings of the scope of claims is an embodiment of the present disclosure.

The present disclosure can also be actualized by various modes in addition to the above-described control unit 29, such as a system of which the control unit 29 is a constituent element, a program enabling a computer to function as the control unit 29, a medium in which the program is recorded, and a control method.

What is claimed is:

1. An electronic control apparatus for a power supply system,
    the power supply system including:
        a rotating electric machine of which a rotation shaft is connected to an output shaft of an engine of a vehicle;
        a power generation control unit that controls at least power generation using the rotating electric machine;
        a first storage battery and a second storage battery that are connected in parallel to the rotating electric machine;
        a first switch that is arranged on a first energization path that electrically connects the rotating electric machine and the first storage battery, and is configured to be switched to either of a first conduction state and a first non-conduction state, the first conduction state being a state in which the first energization path is electrically conductive and the first non-conduction state being a state in which the first energization path is not electrically conductive;
        a second switch that is arranged on a second energization path that electrically connects the rotating electric machine and the second storage battery, and is configured to be switched to either of a second conduction state and a second non-conduction state, the second conduction state being a state in which the second energization path is electrically conductive and the second non-conduction state being a state in which the second energization path is not electrically conductive;
        a switch control unit that controls switching between the first conduction state and the first non-conduction state of the first switch, and switching between the second conduction state and the second non-conduction state of the second switch; and
        a host control unit that is communicably connected to the power generation control unit and the switch control unit, and controls the power generation control unit and the switch control unit,
    the electronic control apparatus being used as the switch control unit,
    the electronic control apparatus comprising:
        a completion determining unit that determines whether a predetermined process completion condition is met, without communicating with the host control unit, after an ignition switch of the vehicle is switched from an on state to an off state, the process completion condition indicating that a predetermined switch-off process is completed, the switch-off process being performed by the power generation control unit after the ignition switch is switched from the on state to the off state; and
        an on-maintaining unit that maintains the first switch in the on state until the completion determining unit determines that the process completion condition is met after the ignition switch is switched from the on state to the off state.

2. The electronic control apparatus according to claim 1, wherein:
    the process completion condition is that a predetermined off-determination time has elapsed from an occurrence of an interruption in the communication between the switch control unit and the host control unit after the ignition switch of the vehicle is switched from the on state to the off state, or the off-determination time has elapsed from when the ignition switch of the vehicle is switched from the on state to the off state.

3. The electronic control apparatus according to claim 2, further comprising:
    a driving cycle setting unit that sets the off-determination time based on an amount of time required for the switch-off process that is performed upon completion of the most recent driving cycle.

4. The electronic control apparatus according to claim 2, further comprising:
    a reception setting unit that, when processing time information indicating an amount of time required for the switch-off process has been received from the host control unit or the power generation control unit, sets the off-determination time based on the received processing time information.

5. The electronic control apparatus according to claim 4, wherein:
    the reception setting unit sets the off-determination time to a predetermined initial value, when communication with a transmission source that transmits the processing time information is interrupted.

6. The electronic control apparatus according to claim 1, wherein:
the completion determining unit determines whether the process completion condition is met based on a current or a voltage of the first switch.

7. A control system for a power supply system,
the power supply system including:
a rotating electric machine of which a rotation shaft is connected to an output shaft of an engine of a vehicle;
a power generation control unit that controls at least power generation using the rotating electric machine;
a first storage battery and a second storage battery that are connected in parallel to the rotating electric machine;
a first switch that is arranged on a first energization path that electrically connects the rotating electric machine and the first storage battery, and is configured to be switched to either of a first conduction state and a first non-conduction state, the first conduction state being a state in which the first energization path is electrically conductive and the first non-conduction state being a state in which the first energization path is not electrically conductive;
a second switch that is arranged on a second energization path that electrically connects the rotating electric machine and the second storage battery, and is configured to be switched to either of a second conduction state and a second non-conduction state, the second conduction state being a state in which the second energization path is electrically conductive and the second non-conduction state being a state in which the second energization path is not electrically conductive;
a switch control unit that controls switching between the first conduction state and the first non-conduction state of the first switch, and switching between the second conduction state and the second non-conduction state of the second switch; and
a host control unit that is communicably connected to the power generation control unit and the switch control unit, and controls the power generation control unit and the switch control unit,
the control system being used as the switch control unit,
the control system comprising:
a processor;
a non-transitory computer-readable storage medium; and
a set of computer-readable instructions stored in the computer-readable storage medium that, when read and executed by the processor, cause the processor to implement:
determining whether a predetermined process completion condition is met, without communicating with the host control unit, after an ignition switch of the vehicle is switched from an on state to an off state, the process completion condition indicating that a predetermined switch-off process is completed, the switch-off process being performed by the power generation control unit after the ignition switch is switched from the on state to the off state; and
maintaining the first switch in the on state until determined that the process completion condition is met after the ignition switch is switched from the on state to the off state.

8. A control method for a power supply system,
the power supply system including:
a rotating electric machine of which a rotation shaft is connected to an output shaft of an engine of a vehicle;
a power generation control unit that controls at least power generation using the rotating electric machine;
a first storage battery and a second storage battery that are connected in parallel to the rotating electric machine;
a first switch that is arranged on a first energization path that electrically connects the rotating electric machine and the first storage battery, and is configured to be switched to either of a first conduction state and a first non-conduction state, the first conduction state being a state in which the first energization path is electrically conductive and the first non-conduction state being a state in which the first energization path is not electrically conductive;
a second switch that is arranged on a second energization path that electrically connects the rotating electric machine and the second storage battery, and is configured to be switched to either of a second conduction state and a second non-conduction state, the second conduction state being a state in which the second energization path is electrically conductive and the second non-conduction state being a state in which the second energization path is not electrically conductive;
a switch control unit that controls switching between the first conduction state and the first non-conduction state of the first switch, and switching between the second conduction state and the second non-conduction state of the second switch; and
a host control unit that is communicably connected to the power generation control unit and the switch control unit, and controls the power generation control unit and the switch control unit,
the control method being used in the switch control unit,
the control method comprising:
determining whether a predetermined process completion condition is met, without communicating with the host control unit, after an ignition switch of the vehicle is switched from an on state to an off state, the process completion condition indicating that a predetermined switch-off process is completed, the switch-off process being performed by the power generation control unit after the ignition switch is switched from the on state to the off state; and
maintaining the first switch in the on state until determined that the process completion condition is met after the ignition switch is switched from the on state to the off state.

* * * * *